(12) United States Patent
Günther

(10) Patent No.: US 11,909,056 B2
(45) Date of Patent: Feb. 20, 2024

(54) BATTERY HOUSING

(71) Applicant: KIRCHHOFF AUTOMOTIVE DEUTSCHLAND GMBH, Attendorn (DE)

(72) Inventor: Alexander Günther, Olpe (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 645 days.

(21) Appl. No.: 17/259,405

(22) PCT Filed: Aug. 21, 2019

(86) PCT No.: PCT/EP2019/072371
§ 371 (c)(1),
(2) Date: Jan. 11, 2021

(87) PCT Pub. No.: WO2020/038996
PCT Pub. Date: Feb. 27, 2020

(65) Prior Publication Data
US 2021/0265690 A1    Aug. 26, 2021

(30) Foreign Application Priority Data

Aug. 21, 2018 (DE) ...................... 10 2018 120 394.2

(51) Int. Cl.
*H01M 50/207* (2021.01)
*H01M 50/233* (2021.01)
(Continued)

(52) U.S. Cl.
CPC ............ *H01M 50/207* (2021.01); *B60K 1/04* (2013.01); *H01M 50/204* (2021.01);
(Continued)

(58) Field of Classification Search
CPC ............ H01M 50/207; H01M 50/204; H01M 50/224; H01M 50/233; H01M 50/236;
(Continued)

(56) References Cited

U.S. PATENT DOCUMENTS

2015/0255764 A1*  9/2015  Loo ................... H01M 50/249
                                                                 429/149
2018/0062128 A1   3/2018  Günther
(Continued)

FOREIGN PATENT DOCUMENTS

CN       207657589 U       7/2018
DE    102016110330 A1     12/2017
(Continued)

OTHER PUBLICATIONS

Examination report dated Apr. 20, 2023 in related Chinese application 201980052618.3.
(Continued)

*Primary Examiner* — Christopher P Domone
(74) *Attorney, Agent, or Firm* — Polson Intellectual Property Law PC; Margaret Polson; Christopher Sylvain

(57) ABSTRACT

A battery housing for a vehicle comprising a trough with a base and with side walls connected to the base, and comprising a frame structure. In its edge area, the base has at least one embossment, which is offset into the trough interior and follows the course of the adjacent side wall, with a connection section, which is offset with respect to the base and to which the frame structure is connected, and with a transition section arranged between the connection section and the base. The transition section has an offset amount with respect to the base that corresponds at least to the material thickness of the base.

16 Claims, 3 Drawing Sheets

(51) Int. Cl.
 *B60K 1/04* (2019.01)
 *H01M 50/224* (2021.01)
 *H01M 50/204* (2021.01)

(52) U.S. Cl.
 CPC ....... *H01M 50/224* (2021.01); *H01M 50/233* (2021.01); *H01M 2220/20* (2013.01)

(58) Field of Classification Search
 CPC ............. H01M 50/238; H01M 50/242; H01M 50/244; H01M 50/289; H01M 50/291; H01M 50/293; H01M 2220/20
 See application file for complete search history.

(56) References Cited

U.S. PATENT DOCUMENTS

| | | |
|---|---|---|
| 2018/0138471 A1 | 5/2018 | Shimada |
| 2019/0036092 A1 | 1/2019 | Günther |
| 2019/0229311 A1 | 7/2019 | Günther |
| 2019/0252741 A1 | 8/2019 | Günther |
| 2019/0259994 A1 | 8/2019 | Günther |
| 2019/0273231 A1 | 9/2019 | Günther |
| 2019/0337402 A1 | 11/2019 | Günther |
| 2019/0381899 A1 | 12/2019 | Günther |
| 2020/0295322 A1 | 9/2020 | Günther |
| 2022/0059894 A1* | 2/2022 | Stephens .................. B60K 1/04 |

FOREIGN PATENT DOCUMENTS

| | | |
|---|---|---|
| DE | 102016115037 A1 | 2/2018 |
| EP | 2916369 A1 | 9/2015 |
| EP | 2945204 A1 | 11/2015 |

OTHER PUBLICATIONS

Examination report dated Aug. 9, 2022 in related Chinese application No. 201980052618.3.
Examination report dated Jul. 5, 2023 in related Chinese application 201980052618.3.
U.S. Appl. No. 16/633,282, filed Jan. 23, 2020 (Günther), applicant Kirchhoff Automotive Deutschland GmbH. Per USPTO waiver of Rule 1.98(a)(2)(iii) requirement.
International Search Report (ISR) of the International Searching Authority (ISA) dated Oct. 31, 2019 in parent international application PCT/EP2019/072371.
Written Opinion (WO) of the International Searching Authority (ISA) dated Oct. 31, 2019 in parent international application PCT/EP2019/072371.

* cited by examiner

BATTERY HOUSING

BACKGROUND

The disclosure relates to a battery housing for a vehicle comprising a trough with a base and with side walls connected to the base and comprising a frame structure.

In addition to a trough with a base, battery housings of this type comprise side walls connected to the base as well as a cover. Batteries and/or battery modules composed of several individual battery cells for electromotively operated or hybrid vehicles such as passenger cars, industrial trucks, etc. are installed in this housing, which is made up of a trough and cover. The battery modules are located above the upper side of the base facing into the trough interior. These batteries are high-voltage batteries, the placement of which must meet certain requirements. It is essential that the battery module or modules are protected from external influences in their battery housing and that they do not pose a risk in an accident scenario or that a possible risk is kept as low as possible. In particular, it should be taken into account that mechanical damage to the battery modules can cause them to catch fire.

Battery housings for electromotively operated vehicles are typically installed in the base of the vehicle. For a weight distribution that is as even as possible, the battery housing is designed with a fairly large base area in order to be able to accommodate the necessary battery volume. This can take up almost the entire width and length of the vehicle.

At the same time, such a vehicle must be safe during an accident. Such an accident scenario is, for example, a side impact, a head-on collision, or another collision situation. In these cases, the vehicle and thus also the battery housing must be designed in such a way that it can withstand an accident at least up to a certain impact force without endangering the occupants. In addition, the battery modules arranged in the battery housing should also withstand such an impact without damage up to a certain impact force.

Conventional battery housings comprise a trough for receiving the battery modules, the base of which is flat. According to one possible design of such a battery housing, a frame structure is attached to the edge of the base. According to another design, the trough is a deep-drawn component, so that the side walls are made with the base in one piece. The frame structure is on the outside with respect to the side walls.

DE 10 2016 115 037 A1 discloses such a design. In this design, a reinforcing structure part is connected to the base in the edge area. This reinforcing structure part, which can be structured towards the inside of the trough, forms a reinforcement profile together with an outer wall part connected thereto. In this prior art, the side wall is thus formed by this reinforcement profile, the inside of which delimits the inside of the trough. An outer frame structure is connected with one of its two legs to the outside of the outer wall component. With a second leg, the frame structure is connected to the lower side of the reinforcement profile at a distance from the base. Lateral forces absorbed by the frame structure are introduced into the reinforcement profile. In order to prevent force introduction into the base, this force introduction point is designed to be particularly stable thanks to a three-layer material structure.

If force is introduced laterally into the frame structure by an impact, it is more or less unavoidable, mainly due to the size of the flat extension of the base, that these impact forces are also introduced into the base of the battery housing. If the frame structure is deformed or buckled by such an impact, for example a pole impact, it can be observed in many cases that the base of the battery housing bulges inward or tries to do so. The battery modules installed in the battery housing are able to counteract this with a certain resistance. However, the consequence is often that the battery modules are damaged in such a case. A damaged battery module can lead to a fire which, especially in the case of lithium-ion batteries, cannot be extinguished because the oxygen required for such a fire is released from the material of the battery modules.

In order to avert this risk, DE 10 2016 110 330 A1 proposes that beading, which extends parallel to the side wall in the transition area of a side wall into the base, be introduced into the base in order to improve the buckling resistance. In addition, it is proposed to manufacture the base plate from ultra-high-strength manganese-boron alloy steel. These measures are intended to counteract any denting when a lateral force is applied to the frame structure.

SUMMARY

An aspect of the present disclosure is therefore to propose a battery housing in which the crash performance of such a battery module is improved.

This is achieved with a battery housing of the type mentioned at the beginning, in which the base, in its edge area, has at least one embossment, which is offset into the trough interior and which follows the course of the adjacent side wall with a connection section offset as relates to the base to which the frame structure is connected, and has a transition section arranged between the connection section and the base, the transition section having an offset amount relative to the base which corresponds at least to the material thickness of the base.

In its base, this battery housing has an embossment which is offset into the interior of the trough, thus protrudes into the interior of the trough and thus in the direction of the battery volume to be accommodated. The embossment follows the course of at least one adjacent side wall. The battery housing typically has embossments on two opposing side walls. Such an embossment can also be made all the way around. The at least one embossment is located in the edge area of the base of the battery housing, typically at a distance from the inside of the adjacent side wall. It is essential that the embossment with its transition section limits the inner volume of the trough. The frame structure supporting the battery housing is connected to the section of the embossment projecting inward from the plane of the base—the connection section. The connection section is connected to the base via the transition section. As a result of this measure, the upper side of the base pointing into the trough interior is situated in a plane which is offset away from the trough interior as relates to the plane of the connection section. Depending on the desired embodiment, the frame profile can be connected to the connection section on its upper side or its lower side. A transmission of force from the frame profile to the connection section takes place via the contact surface between the frame profile and the connection section.

The frame structure supporting the battery housing is connected to the connection section of the embossment with a positive fit and/or material fit. The force-fit connection provides a transmission of force from the frame structure into the connection section of the base. Forces acting on the battery housing, in particular those forces which are parallel to the base of the battery structure or which at least have such a vectorial component, are introduced into the base via this connection section.

The transition section comprises the part of the embossment that connects the connection section and the base. In this case, the transition area bridges the offset between the base and the connection section and therefore has an offset amount itself. This offset amount is the distance between the parallel planes, formed by the plane of the base and the plane in which a maximum amount of offset lies. This maximum-offset amount typically corresponds to the offset amount of the connection section. The maximum-offset amount of the transition section can, however, also be somewhat larger than the offset amount of the connection section. The maximum-offset amount of the transition section is decisive. In this case, the maximum-offset amount of the transition section corresponds at least to the material thickness of the base that borders the transition area. Typically, however, the offset amount is greater than this minimum maximum-offset amount of the transition section.

As a result of this offset amount and the connection section offset with respect to the base, a force introduced laterally into the battery housing via the frame structure is introduced into the battery housing above the plane of the side of the base facing into the trough interior. Due to the transition area forming the offset, a torque (bending moment) acts via this on the adjoining region of the base, namely a torque pointing away from the interior of the trough. If a lateral force acting on the battery housing cannot be accommodated or absorbed by the frame structure and the base cannot withstand this force, the measure ensures that the base of the battery housing bulges or deforms outward, pointing away from the inside of the battery housing. The risk of damage to the battery modules accommodated in the battery housing due to uncontrolled bulging of the base directed into the interior of the battery housing is thus counteracted. Since a distance is usually provided between the sides of the side walls pointing into the trough interior and the battery modules accommodated therein, the battery housing can experience a certain deformation without the risk of the battery modules contained therein being damaged. Surprisingly, it has been shown that this effect occurs even with a very small maximum-offset amount of the transition area, namely approximately the material thickness of the base. However, the offset amount is preferably somewhat larger and corresponds to two to three times the material thickness of the base.

The embossment is sufficiently rigid so that the forces to be transmitted from the plane of the connection section into the plane of the base in order to initiate the bulging in the direction mentioned can also be introduced into the base. In the case of a base made from a metal plate, for example a steel plate, the embossment has typically been produced by cold forming. However, thermoforming, in particular press hardening, is also possible. The hardening associated with such a deformation is sufficient for the stiffness requirements mentioned.

The advantage of this battery housing is that the controlled reshaping of the base does not necessarily have to stiffen it in the event of an impact. This is associated with the advantage of a lower overall height. The required height for the at least one embossment is small compared to the required height of stiffening elements.

The embossment is carried out in the manner of a flexure. According to one embodiment, the transition section is inclined in its steepest section with respect to the plane of the base. In this case, the steepest section of the embossment forms an angle of more than 90°, typically more than 120°, with the plane of the base and the connection section. As a result, the rigidity of the transition area that is effected for the introduction of torque into the base is improved and hinging into the bending zones is made more difficult.

In one embodiment of the embossment, the connection section has the same maximum-offset amount relative to the base plane as the transition section. The connection section is typically flat and preferably parallel to the base plane. In this embodiment, the embossment is step-like when viewed in cross-section.

According to a first example embodiment, the frame structure is connected to the connection section on its outside facing away from the trough interior by means of a frame structure part, for example a shell as part of a hollow chamber profile to be formed. For this purpose, the connection section comprises a section adapted to the frame structure part. This section can be flat if the connected frame structure part also has a flat connection surface. The space formed by the embossment on the outside with respect to the base is used in a clever way in this embodiment in order to connect a frame structure part thereto. Nevertheless, as described above, the desired torque acts in the event of a necessary deformation of the base when a force is introduced into it. Such a frame structure part is typically part of the frame structure of the battery housing.

In this embodiment, it is advantageous if the side of the frame structure part facing the transition section, for example the end face of the frame structure part, is at a distance from the surface of the transition section facing this frame structure part. This creates a cavity or distance between the frame structure part and the transition section so that the frame structure part is not supported directly on the transition section of the embossment. This is expedient since a force introduced into the frame structure part parallel to the plane of the base is introduced into the connection section in a defined manner, and thus the end having the offset amount is introduced into the end of the transition section.

In a further design of this embodiment, the trough of the battery housing is a one-piece, deep-drawn component, made for example from a sheet steel plate or a light metal plate, for example from a suitable aluminum alloy. The trough consists of a base and side walls molded thereon, possibly additionally with a mounting flange protruding outward from the side walls. This mounting flange can be used to connect a cover with an interposed seal. The side wall molded on the base can be used so that a frame structure part can be supported on it or on the mounting flange, so that, in this manner, a hollow chamber profile is formed with the involvement of the side wall of the trough or a section thereof. This frame structure part can be that which is connected, with its other connection end, to the connection section of the embossment, or it can be a further frame structure part which is connected to the first frame structure part. Thus, the side wall of the trough is integrated into the formation of a hollow chamber profile as a frame structure of the battery housing, which in turn has a positive effect on the requirement for a low weight of the battery housing.

In order to incorporate a force introduced parallel to the base primarily into the base when the frame structure is designed with two frame structure parts, the first frame structure part, which is connected to the connection section of the embossment, is preferably joined on the outside with the second frame structure part in an overlapping manner with respect to the side wall of the trough, with the first frame structure part being arranged on the inside as relates to the second frame structure part.

In one refinement, this hollow chamber profile, which is formed from the frame structure part or parts together with the side wall, is stiffened by an insert plate which divides the hollow chamber formed. This is preferably located in a plane parallel to the plane of the side wall or at least approximately parallel to the side wall.

Typically, the base of such a battery housing has an embossment on the opposite side walls, as described above, especially when only one battery housing and not several adjacent battery housings are provided in the longitudinal or transverse direction of the chassis of the vehicle. In such an embodiment, the embossments of the base are typically situated parallel to the transverse ends of the chassis.

According to a further example embodiment, a frame structure part of the frame structure that forms a side wall is connected to the connection section of the embossment on the inside of the connection section facing the trough interior. This is typically a hollow chamber profile. This hollow chamber profile can be made of a different material than the base. The hollow chamber profile can be, for example, an extruded aluminum profile, while the base is made from a sheet steel plate. In this embodiment, the trough is thus formed from the base and several interconnected frame structure parts. In contrast to the example embodiment described above, the frame structure part or parts are connected to the inside of the connection section pointing in the direction of the embossment of the connection section.

Another advantage of the described battery housings is that the embossment in the edge area provides a supporting surface, which is raised compared to the plane of the base, for the battery module or modules to be accommodated in the battery housing. The lower side of the battery module or modules is then situated a distance away from the inside of the base, said distance being formed with respect to the amount of the maximum offset, so that the battery modules are ventilated on this side.

BRIEF DESCRIPTION OF THE DRAWINGS

The following description uses example embodiments with reference to the accompanying figures, wherein:

FIG. 2b shows an enlarged section of the partial sectional view of FIG. 2a;

DETAILED DESCRIPTION

Figure 5:
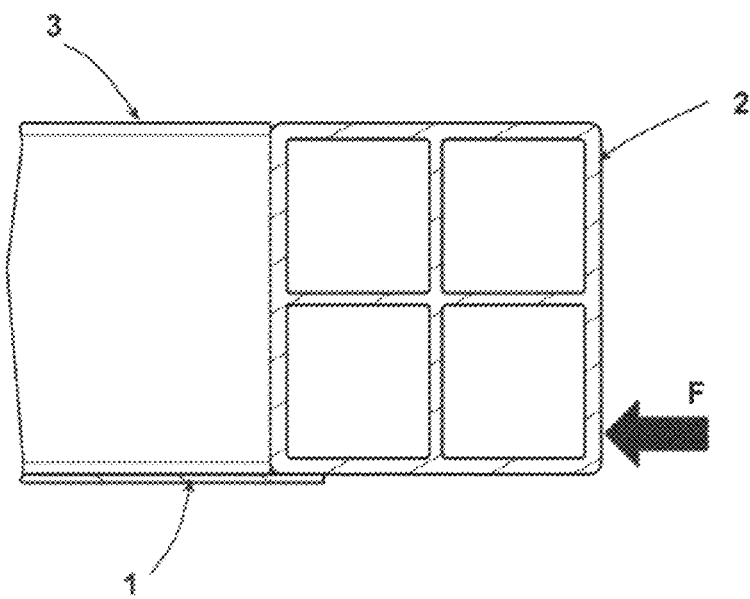
FIG. 5 shows a partial sectional view through a battery housing according to the prior art.

First, an example of the prior art is briefly explained with reference to FIG. 5. A base 1 forms a trough together with hollow chamber profiles 2, 3 connected to one another at the ends. The base 1 is connected to the hollow chamber profiles 2, 3 with its outer edge section, typically by means of a joint connection. The hollow chamber profiles 2, 3 are connected to the upper side of the base 1 facing the inside of the trough. If a force F extending parallel to the base is introduced into the hollow chamber profile 2, the hollow chamber profile 2 directs this force directly into the plane of the base 1, at the transition between the base 1 and the hollow chamber profile 2. Due to the differing stiffness between the hollow chamber profile 2 and the base 1 and the introduction of the force F into the flat extension of the base 1, there is a risk that the base 1 will bulge into the interior of the trough.

This is different than with the subject matter of the example embodiments of the present disclosure described below.

Figure 1:
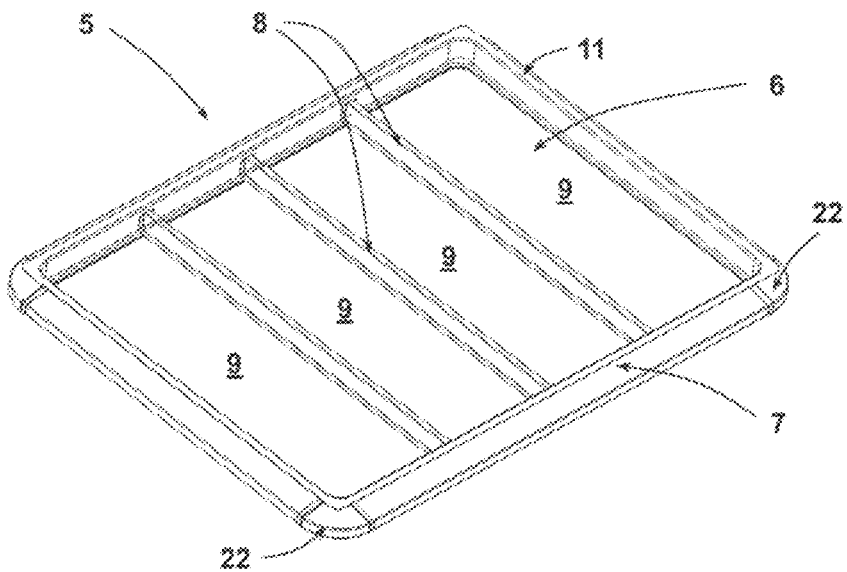
FIG. 1 shows a perspective view of a battery housing according to the present disclosure.

A first embodiment according to the present disclosure is described below with reference to FIG. 1. FIG. 1 shows a battery housing 5. The battery housing 5 comprises a trough 6 and a circumferential frame structure 7. Cross-struts 8 are inserted into the trough 6, which separate adjacent battery module receptacles 9 for battery modules to be inserted. In this example embodiment, the trough 6 is a one-piece, deep-drawn component made of sheet steel. A cover part (not shown in the figures) is used to close the battery housing 1.

The material-fit connection of the frame structure 7 of the battery housing 5 to the trough 6 is explained below with reference to FIGS. 2a, 2b. The trough 6 comprises a base 12, side walls 13 circumferentially molded thereon, and a mounting flange 11 on the top that is bent outward from the trough interior. The base 12 has an embossment 10 in its edge region adjacent to the side wall 13. The inside of the side wall 13 and the base 12 limit the battery volume to be accommodated in the trough 6. A connection section 14 and a transition section 15 are formed by the embossment 10. In the example embodiment shown, the connection section 14 is offset with respect to the plane of the base 12 adjacent to the embossment 10. The upper side of the base 12 is therefore in a different plane in relation to the height of the trough 6, which can be seen in the figure, than the connection section 14, which is offset by the embossment 10, to which the frame structure 7 is connected.

A first frame structure part 16 is materially connected to the connection section 14 on the side facing away from the trough interior—the outside—of the connection section 14. This frame structure part 16 is welded to the connection section 14.

The transition section 15 adjoins the connection section 14. In the example embodiment shown, the transition section 15 corresponds to an elongated S-contour, the steepest section 17 of the transition section 15 being inclined by approximately 120° with respect to the base 12. This means that the plane of the base 12 adjacent to the embossment 10 forms an angle of 120° with the section 17. Since the connection section 14 is offset parallel to the plane of the base 12, this also includes the same angle of 120° with the section 17 of the transition section 15. The maximum-offset amount V of the transition section 15 corresponds to the offset amount V of the connection section 14. Between the first frame structure part 16 and the transition section 15, a distance A is left between the sides or surfaces facing one another—the end face 18 of the first frame structure part 16 and the side 19 of the transition section 15 facing the frame structure part 16 and away from the inside of the trough. This distance A ensures that a force F introduced parallel to the base is introduced, through the frame structure part 16, into the connection section 14 of the embossment 10 and thus with an offset as relates to the plane of the base 12 via the embossment 10.

A second frame structure part 20 is also supported on the side wall 13 of the trough 6. This second frame structure part 20, which is formed as one piece with the frame structure part 16 in the example embodiment shown, is connected to the outside of the wall 13 at a distance from the connection of the first frame structure part 16. Thus, the first frame structure part 16 and the second frame structure part 20 together with the lower section of the side wall 13 thus form a hollow chamber profile, that is the frame structure 7. An insert plate 21 is welded into this hollow chamber profile to reinforce it.

It can be clearly seen that the embossment 10 is offset into the interior of the trough by approximately twice the material thickness D of the base 12. The double material thickness D thus forms the offset amount V. With this embodiment, a force F introduced into the frame structure 7 parallel to the base 12 is introduced into the base 12 above the base plane. The transition area 15 inclined as relates to the base plane transmits this to the actual base 12 with a torque (bending moment), with the result that it bulges away from the interior of the trough following a force R resulting from the torque on the base.

Figure 2A:
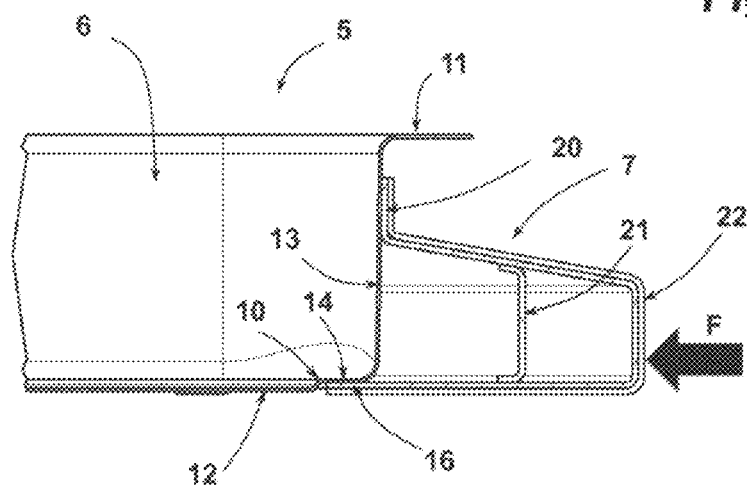
FIG. 2a shows a partial sectional view of the battery housing shown in FIG. 1, transverse to the longitudinal extension.
Figure 2B:
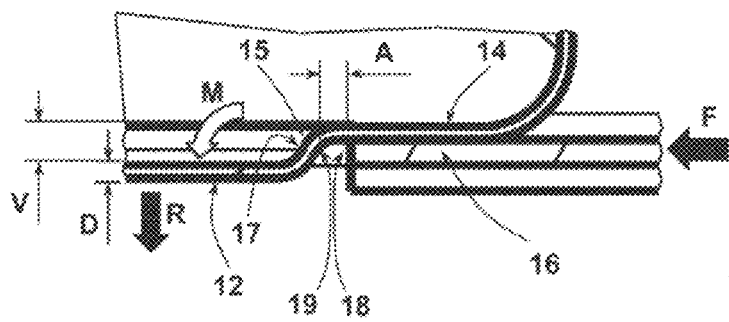

The supports involved in the frame structure 7, of which a longitudinal support is shown in section in FIGS. 2*a*, 2*b*, which supports are designed in the same way on the transverse sides, are connected to one another in the area of the corners of the battery housing 5 by angle pieces 22. The angle pieces 22 are arranged in their respective end regions so as to overlap the supports. FIG. 2*a* shows the end face of an angle piece 22.

Figure 3:
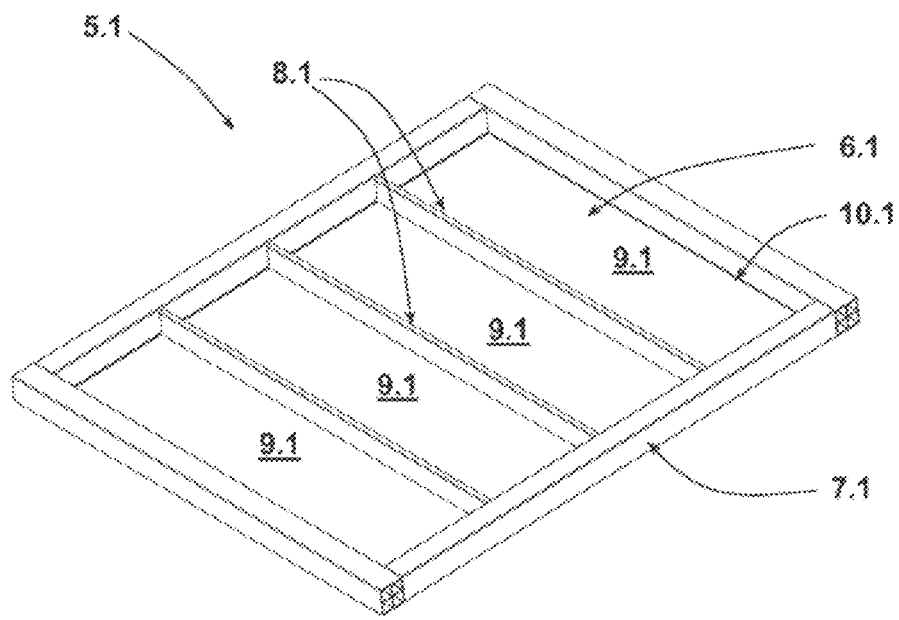
FIG. 3 shows a perspective view of another embodiment of a battery housing according to the present disclosure.

FIG. 3 shows a further embodiment of a battery housing 5.1 according to the present disclosure. In contrast to the first embodiment, battery housing 5.1 comprises a trough 6.1 made up of a base 12.1 and four frame structure parts 7.1 as side walls. The frame structure parts 7.1 are extruded hollow chamber profiles made of a suitable aluminum alloy. This trough 6.1 also has cross-struts 8.1 for providing a plurality of battery module receptacles 9.1. The frame structure parts 7.1 are connected to one another to form a frame structure.

Figure 4:
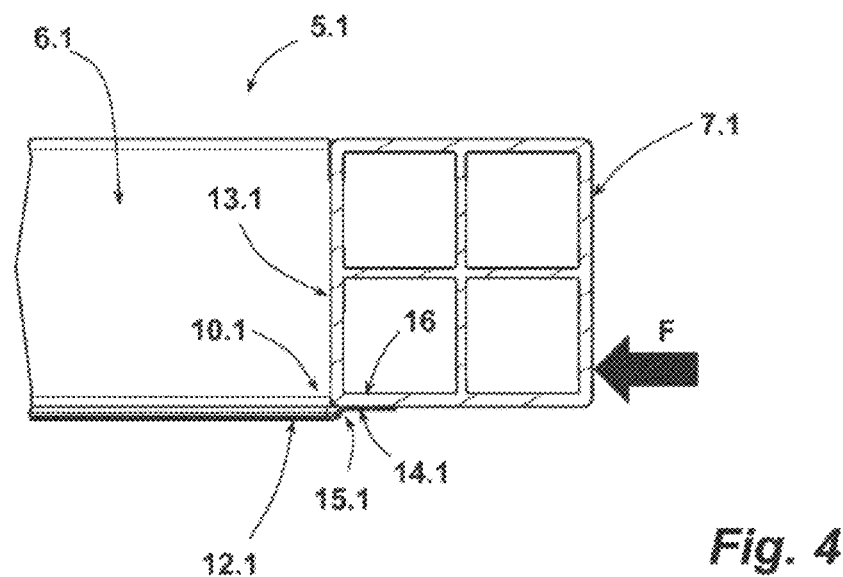
FIG. 4 shows a partial sectional view through the battery housing from FIG. 3, transverse to the longitudinal extension.

FIG. 4 shows a cross-section through a longitudinal support of the battery housing 5.1 shown in FIG. 3. The longitudinal support is a hollow chamber profile 7.1, which is connected to the connection section 14.1 of an embossment 10.1, which is formed circumferentially in the edge area in the base 12.1. The embossment 10.1 is identical to the particular embodiment described in FIGS. 1 to 2*b*. Therefore, the statements regarding this also apply to embossment 10.1. In contrast to the first embodiment, the frame structure 7.1 connected to the base 12.1 forms a side wall 13.1 of the trough 6.1. The frame structure 7.1 is connected to the connection section 14.1 on the side of the connection section 14.1 pointing to the inside of the trough in a force-fitting manner and while utilizing the entire width of the connection section 14.1 discernible in FIG. 4, typically by welding. If a force acting on the frame structure 7.1 parallel to the base 12.1 is introduced into the base 12.1, a torque M is likewise generated in the transition section 15.1, which causes the base 12.1 to bulge away from the trough interior when force F acting on the battery housing 5.1 cannot be accommodated or absorbed by the frame structure 7.1.

The invention has been described by means of two example embodiments with reference to the figures. Without departing the scope of the claims, numerous modifications and further embodiments result for a person skilled in the art for implementing the teachings according to the invention, without the same having to be specifically explained or shown in greater detail within the scope of these statements.

LIST OF REFERENCE NUMERALS

1 Base plate
2, 3 Hollow chamber profile
5, 5.1 Battery housing
6, 6.1 Trough
7, 7.1 Frame structure
8, 8.1 Cross-strut
9, 9.1 Battery module receptacle
10, 10.1 Embossment
11 Mounting flange
12, 12.1 Base
13, 13.1 Side wall
14, 14.1 Connection section
15, 15.1 Transition section
16 First frame structure part
17 Steepest section of the transition area
18 End face of the first frame part
19 Opposite side of the transition area
20 Second frame structure part
21 Insert plate
22 Angle piece
F Force
D Thickness of the base
V Offset amount
A Distance
M Bending moment
R Resulting force

The invention claimed is:

1. A battery housing for a vehicle comprising:
a frame structure and a trough with a base and with side walls connected to the base forming a trough interior,
wherein the base has at least one embossment which is offset into the trough interior and which follows the course of an adjacent side wall,
wherein the embossment has a connection section and a transition section, the connection section is offset relative to the base by an offset amount and connected to the frame structure, and the transition section is arranged between the connection section and the base,
wherein the transition section has a maximum offset amount with respect to the base, and the maximum offset amount corresponds at least to a material thickness of the base, such that as a result of the maximum offset amount of the transition section and the connection section being offset from the base, a force introduced laterally into the battery housing via the frame structure is introduced into the battery housing above a plane of the base facing into the trough interior and, due to the transition section offsetting the connection section from the base, a torque (bending moment) acts via the transition section on an adjoining region of the base, with a direction of the torque pointing away from the trough interior of the trough.

2. The battery housing of claim 1, wherein the maximum offset amount of the transition section corresponds to at least approximately twice the material thickness of the base.

3. The battery housing of claim 1, wherein the transition section is inclined in a steepest section thereof with respect to the plane of the base.

4. The battery housing of claim 1, wherein the offset amount of the connection section with respect to the base is the same as the maximum offset amount of the transition section.

5. The battery housing of claim 1, wherein a frame structure part of the frame structure is connected to the connection section on an outside thereof facing away from the trough interior.

6. The battery housing of claim 5, wherein a side of the frame structure part facing the transition section is spaced apart from a surface of the transition section, said surface of the transition section facing away from the trough interior and toward the frame structure part, which is connected to the connection section.

7. The battery housing of claim 5, wherein the trough is a one-piece, deep-drawn component.

8. The battery housing of claim 7, wherein the trough is made of steel or aluminum.

9. The battery housing of claim 5, wherein the frame structure part is a first frame structure part, and a second frame structure part of the frame structure is attached to the side wall of the trough adjacent to the connection section or to a section thereof.

10. The battery housing of claim 9, wherein the first frame structure part connected to the connection section and the second frame structure part supported on the side wall of the trough are connected and form a hollow chamber profile together with the side wall the trough.

11. The battery housing of claim 1, wherein a frame structure part of the frame structure forming a side wall of the trough is connected to the connection section on an inside thereof facing the trough interior.

12. The battery housing of claim 11, wherein the base of the trough is a one-piece, deep-drawn component.

13. The battery housing of claim 12, wherein the base is made of steel or aluminum.

14. The battery housing of claim 1, wherein the base has two embossments arranged on opposite sides of the base.

15. The battery housing of claim 1, wherein the base has a circumferential embossment following the side walls of the trough.

16. The battery housing of claim 1, wherein the battery housing further comprises at least one battery module resting on the embossment.

\* \* \* \* \*